United States Patent
Grime

[11] 3,903,985
[45] Sept. 9, 1975

[54] SAFETY APPARATUS FOR USE IN A VEHICLE TO RESTRAIN THE MOVEMENT OF AN OCCUPANT

[75] Inventor: Geoffrey Grime, Swansea, England

[73] Assignee: Accles-Britax Limited, Warley, England

[22] Filed: Aug. 19, 1974

[21] Appl. No.: 498,763

[30] Foreign Application Priority Data
Aug. 30, 1973  United Kingdom............... 40842/73

[52] U.S. Cl............................................. 180/82 C
[51] Int. Cl.²...................................... B60R 21/10
[58] Field of Search................ 180/82 R, 82 C, 103; 280/150 B, 150 SB; 297/383, 384, 385, 386

[56] References Cited
UNITED STATES PATENTS

| | | | |
|---|---|---|---|
| 3,524,678 | 8/1970 | Laenne | 280/150 B X |
| 3,741,330 | 6/1973 | Monaghan | 280/150 B |
| 3,764,159 | 10/1973 | Grime | 280/150 B |
| 3,811,701 | 5/1974 | Grime | 280/150 B |
| 3,834,728 | 9/1974 | Anderson | 280/150 B |
| 3,838,746 | 10/1974 | Andres | 180/82 C |

*Primary Examiner*—Leo Friaglia
*Assistant Examiner*—R. Schrecengost
*Attorney, Agent, or Firm*—Baldwin, Wight & Brown

[57] ABSTRACT

Safety apparatus for use in a vehicle to restrain the movement of an occupant. The safety apparatus includes a pivoting arm which supports a chest pad and which is movable against a light bias except when locked automatically by means responsive to vehicle acceleration and deceleration. The locking means is coupled to the footbrake system of the vehicle to cause the arm to be locked when the footbrake is depressed. Arrangements are disclosed for gradually increasing absorption of energy when said arm moves. A latching arrangement is also described which is released when the occupant is seated, final movement of the arm being cushioned by damping means.

14 Claims, 5 Drawing Figures

SAFETY APPARATUS FOR USE IN A VEHICLE TO RESTRAIN THE MOVEMENT OF AN OCCUPANT

This invention relates to safety apparatus for use in a vehicle to restrain the movement of an occupant. More particularly, the invention is an improvement in, or modification of, the invention disclosed in U.K. Pat. No. 1,367,876.

The safety apparatus disclosed in U.K. Pat. No. 1,367,876 generally comprises a pivotally mounted arm which supports the chest pad, means for lightly biasing said arm towards an occupant's chest and means responsive to acceleration or deceleration of the vehicle, or to sudden movement of the arm by said occupant, for automatically locking the arm whereby the arm is movable against said light bias except when locked. Recoiless energy absorption means can be coupled to the arm whereby, when the arm is locked, the energy is absorbed which is due to forward momentum of the occupant when the vehicle decelerates. Such apparatus is particularly effective to restrain movement of the occupant in a vehicle collision and when the vehicle accelerates, or is driven at high speed around corners.

When the vehicle is driven at low speeds, such as through town, the means responsive to the motion of the vehicle for locking the arm may not be effective. For example, the motion of the vehicle may be insufficient to move an inertial mass which is arranged to actuate the locking device. This may not be discomfort to the driver of the vehicle, because the driver can restrain his forward momentum by gripping the steering wheel. However, it may be a discomfort to a passenger who does not restrain his motion by gripping a part of the vehicle. One of the objects of this invention is to increase the occupant's comfort and protection by providing additional means to lock said arm when the footbrake system of the vehicle is operated.

The present invention generally provides safety apparatus for use in a vehicle to restrain the movement of an occupant, the safety apparatus comprising a housing for attachment to said vehicle; a shaft supported by said housing; a rigid arm having one end portion rotatably mounted on said shaft, a pad mounted at the other end of said arm for acting against chest of said occupant; a recoiless energy absorption member coupled to said one end portion of said arm; a locking member coupled to said recoiless energy absorption member and slidably supported in said housing; a locking pawl mounted for movement in said housing to arrest movement of said locking member; means responsive to acceleration or deceleration of said vehicle for moving said pawl to lock said locking member; biasing means coupled between said housing and said arm for lightly biasing said arm towards said occupants chest except when said locking member is locked; and means for operative connection to the footbrake system of said vehicle to move said pawl to lock said locking member when said footbrake system is operated.

An object of a preferred embodiment of the invention is to minimise the size of the apparatus and to provide a compact device which can be fitted to the vehicle to extend longitudinally between the driver and front passenger seats. This object can be realised by arranging for the recoiless energy absorption member (such as a collapsible tube) to be substantially colinear with the locking member. These components are mounted in an elongated housing of shallow dimensions. The locking member and the locking pawl may have corresponding teeth for engagement whereby movement of said locking member is arrested. The pawl may be pivotally mounted and acted upon by a movable carrier which supports a mass, inertially responsive to the vehicle motion, for causing locking engagement between said pawl and said locking member. The carrier may be pivotally attached to the housing by pivots which are located in slots to enable both rocking (sideways) movement as well as pivotal (fore and aft) movement to cause the pawl to engage the bar in the case of, for example, a side impact or a frontal impact of the vehicle. Preferably, the carrier includes a member spaced from its pivot point, which member supports the pawl and actuates it when the carrier pivots. Suitably, the pawl is coupled to the armature of a solenoid which is energised through a switch operated by depressing the footbrake of the vehicle.

Another object of the referred embodiment of the invention is to increase the rate of energy absorption by the recoiless energy absorption means when the locking device is actuated and the occupant applies force to the chest pad. This object is fulfilled by arranging for a portion of said arm to extend beyond said shaft and to be pivotally connected to one end of the recoiless energy absorption member, for example, a collapsible tube. The arrangement is such that the angle between the axis of the tube and a line passing through the axes of said pivotal connection and said shaft is initially less than 90° when said arm is in its normal restraint position and such that said angle increases to 90° when said arm is subsequently pivoted forwardly of said occupant. Thus, the deformative resistance offered by said tube, when said locking member is arrested, is gradually increased during said arm movement.

The apparatus preferably includes means for securing the arm in an inoperative positioned where the pad is based from the occupants chest. The securing means may comprise a latch of which one portion is attached to the locking member and another portion is mounted in the housing to engage said one portion when the arm is in its inoperative position. The latch may be connected to the armature of a solenoid which is energised through the ignition circuit of the vehicle, a pressure switch in the occupants seat, and a limit switch on said other portion of the latch; the limit switch de-energising said solenoid, when the latch has been disengaged, in order to conserve the power of a battery mounted in the vehicle. A dashpot damper, frictional means, or a spring may be provided to damp movement of the arm when it moves, under said light bias, into its operative position in front of the occupants chest. The damping means preferably includes a lost-motion arrangement whereby the arm is initially acted upon by maximum light bias, to ensure latch disengagement, before the damping means operates to cushion engagement of the pad with the occupants' chest.

Other objects and advantages of the invention and its preferred embodiment will become apparent with reference to the following description taken in conjunction with the accompanying drawings, in which.

Figure 1:
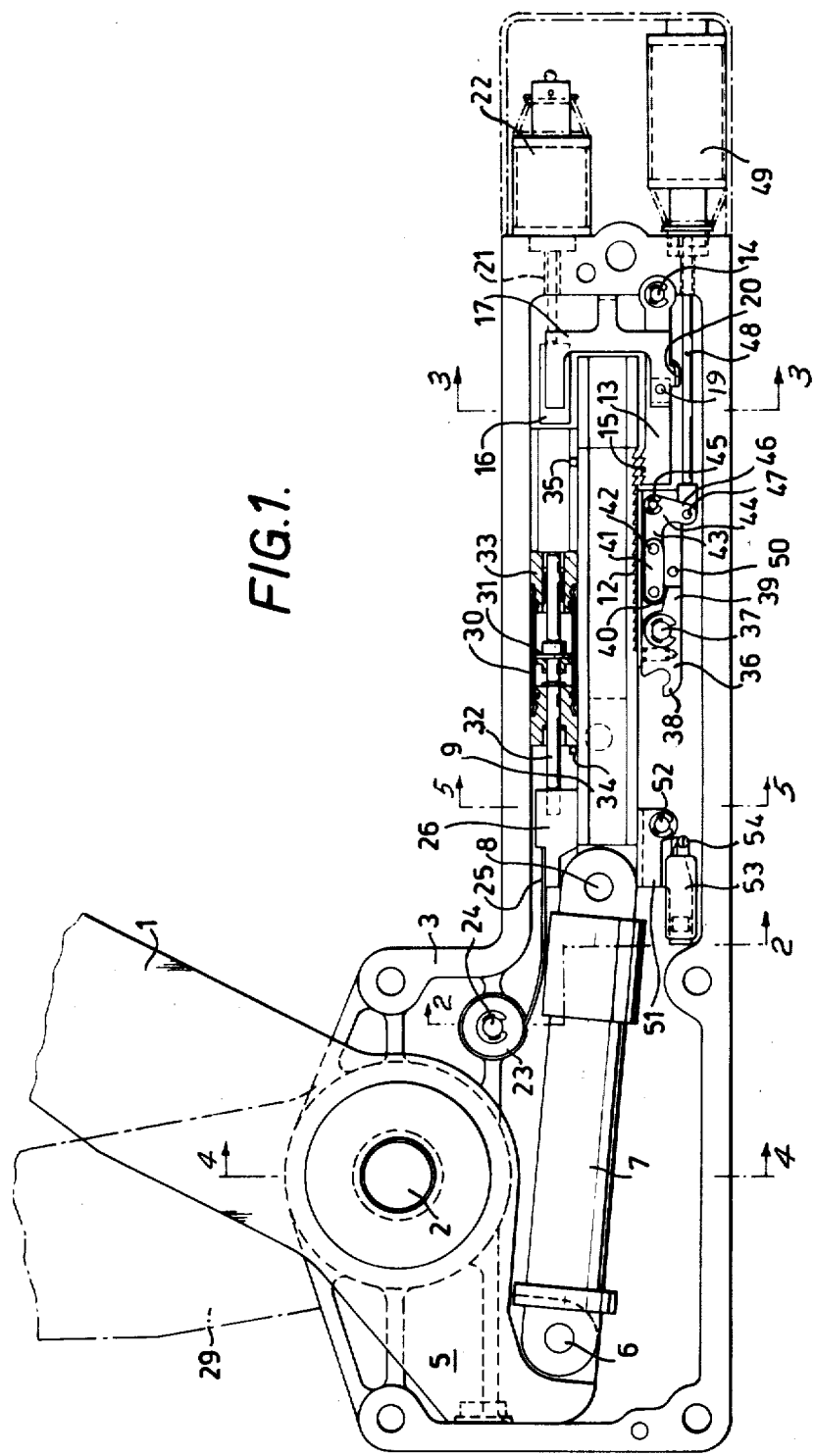
FIG. 1 is a side sectional view of safety apparatus according to the invention.
Figure 2:
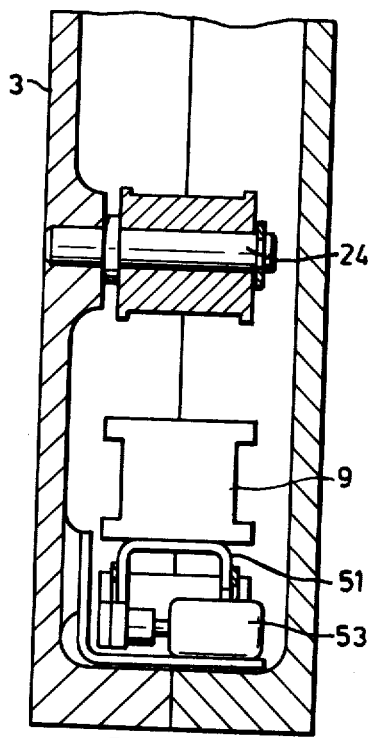
FIG. 2 is a section through the line 2—2 of FIG. 1.

The safety apparatus shown in the drawings is mounted on the floor of the vehicle between the front seats. A rigid arm 1 is mounted on a shaft 2 supported in a housing 3. The housing 3 may be dimensioned for installation in a saddle (not shown) which is made to fit the local floor area between the front seats. A chest pad (not shown) which may be of a shape as described in U.K. Pat. No. 1,367,876, is mounted on an upper end (not shown) of the arm 1. The pad may be supported by an eccentric mounting whereby its height can be adjusted by rotation through 180°, a locking device being provided to secure the pad in each of two positions. When the arm 1 is in an operative position it is located immediately in front of, of against, the chest of a seated occupant. A lever 5, attached to a lower end portion of arm 1, is pivotally connected at 6 to recoiless energy absorption means comprising a collapsible tube 7. Tube 7 is connected by a pivot 8 to a bar 9. Tube 7 acts as a recoiless energy absorber to retard arcuate movement of arm 1 when pivot 8 is fixed (as explained below) and the occupant is thrown against the pad due to sudden movement of the vehicle. Tube 7 absorbs the energy of impact by compressive deformation such as by turning inside out, bulging, being crushed or by causing extrusion.

Figure 5:
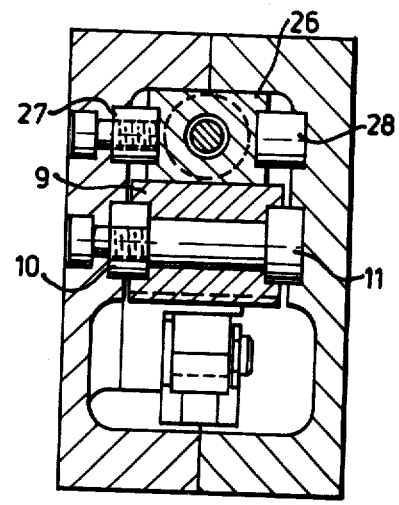
FIG. 5 is a section through the line 5—5 of FIG. 1.
Figure 4:
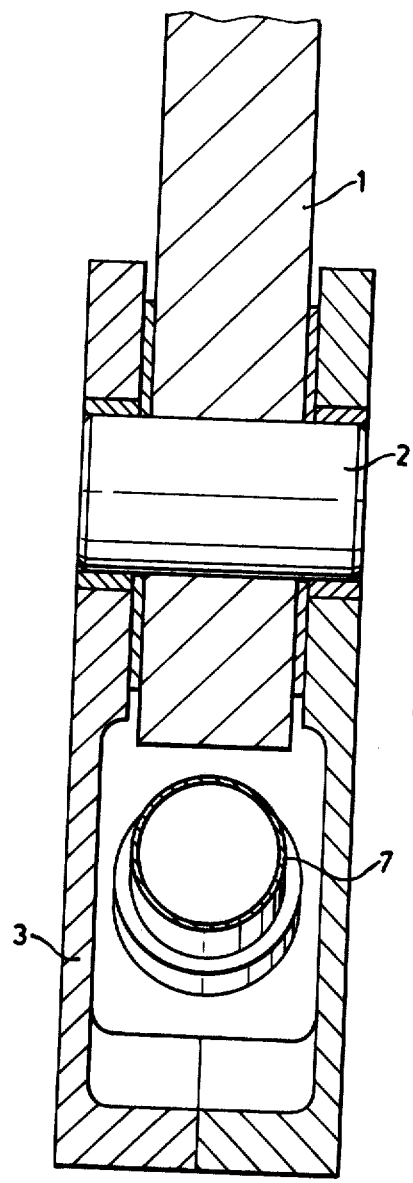
FIG. 4 is a section through the line 4—4 of FIG. 1.

When the vehicle is being driven at a steady speed and the apparatus is not subjected to deceleration or acceleration above a predetermined minimum value, bar 9 can move longitudinally in linear bearings 10, 11 shown in section in FIG. 5. The extent of travel of bar 9 is limited by stops with regard to the required arcuate movement of arm 1.

When the apparatus is subjected to deceleration or acceleration above the predetermined minimum valve, bar 9 is locked in position whereby pivot 8 is fixed as mentioned above. The manner in which bar 9 is locked will now be described.

Figure 3:
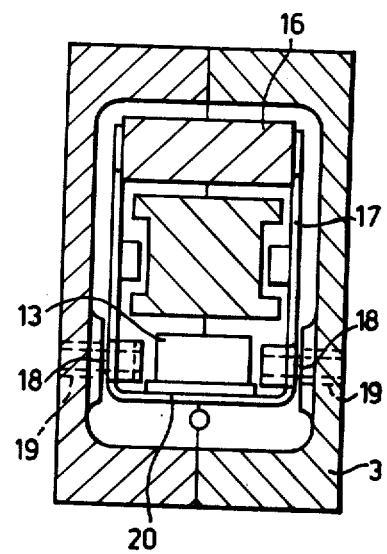
FIG. 3 is a section through the line 3—3 of FIG. 1.

Bar 9 has a plurality of teeth 12 in the form of a rack positioned for movement over a locking lever or pawl 13 which is pivotally mounted on a shaft 14 supported by the housing 3. Pawl 13 is provided with a plurality of teeth 15 corresponding to teeth 12 on bar 9. A mass 16 is attached to a carrier 17, of open box structure, which is pivotally mounted on pins 18 supported in holes 19 in each side of the housing 3 (FIG. 3). Holes 19 are preferably vertical slots to enable sideways rocking movement of the carrier 17. A cross bar 20 of the carrier 17 passes beneath and supports pawl 13. The cross bar 20 is spaced from the pivot 14 of the pawl 13 so that when the carrier rotates (or rocks, if holes 19 are vertical slots), the cross bar 20 urges pawl 33 upwardly to cause locking engagement between teeth 12 and 15. The inertia of mass 16 causes it to move when the vehicle decelerates, or accelerates (or when holes 19 are vertical slots, when the vehicle is subjected to sideways deceleration or acceleration). Mass 16 is selected and arranged on the carrier 17 such that when the mass 16 is subjected to a deceleration or acceleration equal to, or greater than the predetermined minimum value, for example, 0.4g it moves the carrier 17 to urge pawl 13 upwardly to cause locking engagement between teeth 12 and 15.

The pivoted end of the lever or pawl 13 is mounted in a recess in the housing (adjacent a thick wall) whereby said housing acts to withstand axial forces applied to the lever or pawl 13 when teeth 12 and 15 are engaged and the arm 1 is pivoted. This relieves the stress on the shaft 14 and provides greater safety.

Carrier 17 is also coupled by means of a pushrod 21 to the armature of a solenoid 22. Solenoid 22 is energised by a switch (not shown) which is closed, for example, when the footbrake of a vehicle is depressed, whereby the pushrod 21 is drawn towards the solenoid 22 to move the carrier 17 and bar 9 is locked by engagement of teeth 12 and 15. Thus, if the vehicle is braked, for example when a collision is foreseen, and the mass 16 is not subjected to the predetermined deceleration of, for example, 0.4g, the solenoid is energised to cause bar 9 to be locked. This prevents the occupant from sliding forward in his seat into an unfavourable position to withstand an impact. Other advantages of this arrangement are that delay in locking bar 9 is substantially eliminated (thereby increasing the efficiency of restraint) and that a sleeping passenger would be prevented from sliding off his seat when the brakes are applied.

The arm 1 is lightly biased, towards the occupant's chest, by a constant force coil spring 23 mounted on a shaft 24 supported by the housing 3. One end of spring 23 is fixed relative to the housing 3 and its other end 25 is attached to a slidably mounted block 26. Block 26 is attached to bar 9 and is mounted in linear bearings 27, 28 shown in section in FIG. 5. When arm 1 is located in an operative position (widely spaced from the occupant's chest) shown by the chain and dot line 29, bar 9 has moved to the right of the drawing and spring 23 has been wound up to its maximum tension. Arm 1 is held in its inoperative position by a latch as explained below. On releasing the latch, spring 23 applies a force to bar 9 urging it towards the left of the drawing and hence arm 1 moves under this bias towards the operative position before the occupant's chest. The maximum force exerted by spring 23 at the start of this movement overcomes the inertial forces acting on the arm 1, particularly when the chest pad and the arm occupy an inoperative position in which their combined mass acts vertically through that side of shaft 2 remote from the occupant.

Although the biasing force exerted on arm 1 decreases as the arm moves between its inoperative and operative positions, it is preferable to employ damping means to prevent, or to cushion, an impact between the pad and the occupant's chest. This is achieved, as shown in the drawings, by a dash pot comprising a "floating" cylinder 30 housing a piston 31 attached by a pushrod 32 to block 26. Cylinder 30 is free to move slidably in the space 33 between bar 9 and an upper portion of housing 3. However, movement of cylinder 30 is limited by stops 34, 35 for reasons which will become apparent in the following functional description of the damping means.

Assuming that the piston 31 is at the right hand end of its cylinder 30 and that the arm 1 has just been released from its inoperative position, bar 9 and hence block 26 move towards shaft 2 and piston 31 drags cylinder 30 because the frictional forces acting on the exterior of cylinder 30 are less than the damping resistance between the piston 31 and cylinder 30. Before the arm 1 reaches its operative position, cylinder 30 strikes stop 34 and the piston 31 then moves through the cylinder 30 whereby a damping force is applied to the arm 1. Final movement of arm 1 is thereby slowed and the pad is positioned lightly before the chest of the occupant. When the arm 1 is moved back to its inoperative position, the piston 31 carries the cylinder 30 back to its starting position and moves through the cylinder away from shaft 2. Another stop 35 is preferably located between the cylinder 30 and the mass 14 to prevent the mass from being displaced.

Other damping means may be used, for example, a roller or a brush which meets a friction member at the end of a path of travel corresponding with the final path of movement of the arm 1 towards its operative position. Alternatively, a portion of lever 5 is adapted to support a cam with a doubly-inclined surface (possibly on a pressing attached to a groove in lever 5) and a spring, attached to housing 3 opposite lever 5, is arranged to engage the cam surface.

The latch provided to secure arm 1 in its inoperative position comprises a latching arm 36 pivotally mounted on a shaft 37. Arm 25 has a hook portion 38 at one end and a ramp portion 39 at the other end. Ramp portion 38 is engaged by a roller 40 pivotally attached to a linking arm 41 connected by a pivot 42 to one end 43 of a bell crank lever 44. Bell crank lever 44 is pivotally mounted on a shaft 45 and its other end 46 is connected by a pivot 47 to a pushrod 48. Pushrod 48 is coupled to the armature of a solenoid 49. Solenoid 49 is connected via the ignition circuit of the vehicle (for example, the ignition switch of the vehicle) a pressure sensitive switch beneath the occupant's seat and limit switch 53, to the vehicle battery. When the circuit is complete, solenoid 49 is energised and pushrod 48 moves to rotate the bell crank lever 44 whereby the linking arm 41 is downwardly inclined to withdraw the roller 40 from the ramp portion 39. The roller 40 is withdrawn, the latching arm 36 rotates anticlockwise because the hook portion 38 is heavier than the ramp portion 39.

A carrier 51 is fixed to the leading end of bar 9 adjacent pivot 8. Carrier 51 supports a pivoted roller 52. Roller 52 engages hook portion 38 when arm 1 is moved to its inoperative position. The limit switch 53, having an actuator 54, is provided for deenergising solenoid 49 when the hook portion 38 is disengaged from roller 52. This prevents the battery of the vehicle from running down.

The safety apparatus described above operates as follows:

When the vehicle is unoccupied or when an occupant wishes to alight, arm 1 is stored in the inoperative position shown by the chain and dot lines 29. The arm is maintained in the inoperative position because hook position 38 engages roller 52.

When the occupant is seated in the vehicle and the ignition switch is turned on, solenoid 34 is energised and hook portion 38 is disengaged from roller 52. Arm 1 is then biased by spring 23 to rotate about shaft 2 whereby the pad moves towards the occupant's chest. Cylinder 30 and piston 31 control the final movement of the arm 1 so that the pad is positioned gently against the occupant's chest. If the vehicle is then driven so that the predetermined minimum gravitational force is not exerted on mass 16, arm 1 can be moved by the occupant against the light bias exerted by spring 23.

If the vehicle is subjected to deceleration or acceleration exceeding the predetermined value, mass 16 moves to raise pawl 13 to cause locking engagement between teeth 12 and 15. Further movement of arm 1 depends on the force exerted on it by the occupant and on the compressional resistance of tube 7. If, for example, the vehicle deceleration and change of velocity are sufficient, tube 7 is deformed under constant compressive force to retard the occupant's forward movement.

When the vehicle is driven at low speeds, for example, in town traffic, the predetermined deceleration or acceleration of, for example, 0.4g may not be exerted on mass 16 when the footbrake is operated. In this case, solenoid 22 is energised when the footbrake is depressed and bar 9 is locked by engagement between teeth 12 and 15. Under such conditions, sleeve 7 would not be deformed.

An inspection cover may be provided in housing 3 for maintenance and replacement of sleeve 7.

In order to provide the best position for the chest pad it may be necessary to use a cranked arm 1 in some vehicles and/or to arrange a portion of the arm to be inclined to the vertical. When such an inclined portion extends away from the shaft 2, the shaft 2 is preferably mounted substantially at right angles to the inclined portion, i.e. inclined to the horizontal, whereby twisting moments are avoided at the shaft which would otherwise be exerted when the arm 1 is pivoted.

What is claimed is:

1. Safety apparatus for use in a vehicle to restrain the movement of an occupant, the safety apparatus comprising a housing for attachment to said vehicle; a shaft supported by said housing; a rigid arm having one end portion rotatably mounted on said shaft; a pad mounted at the other end of said arm for acting against the chest of said occupant; a recoiless energy absorption member coupled to said one end portion of said arm; a locking member coupled to said recoiless energy absorption member and slidably supported in said housing; a locking pawl mounted for movement in said housing to arrest movement of said locking member; means responsive to acceleration or deceleration of said vehicle for moving said pawl to lock said locking member; biasing means coupled between said housing and said arm for lightly biasing said arm towards said occupant's chest except when said locking member is locked; and means for operative connection to the footbrake system of said vehicle to move said pawl to lock said locking members when said footbrake system is operated.

2. Safety apparatus according to claim 1 wherein said recoiless energy absorption member is substantially colinear with said locking member and is pivotally connected, at respective ends, to said one end portion of said arm and to said locking member.

3. Safety apparatus according to claim 2 wherein said recoiless energy absorption member if formed by a tube, said tube being axially deformable when said locking member is arrested and a force is applied to said pad by said occupant when said vehicle decelerates; the deformation of said tube providing said recoiless energy absorption.

4. Safety apparatus according to claim 3 wherein said one end portion of said arm extends beyond said shaft and is pivotally connected to one end of said tube such that the angle between the axis of said tube and a line passing through the axes of said pivotal connection and said shaft is initially less than 90° when said arm is in its normal restraint position and such that said angle increases to 90° when said arm is subsequently pivoted forwardly to said occupant; the arrangement being such that the deformative resistance offered by said tube, when said locking member is arrested, is gradually increased during said arm movement.

5. Safety apparatus according to claim 1 wherein said means responsive to acceleration or deceleration of said vehicle comprises a carrier which is mounted within said housing to enable pivotal movement axially of said locking member and a mass supported by said carrier which, due to its inertia, is effective to pivot and to rock said carrier with respect to the motion of said vehicle; said locking pawl being coupled to said carrier such that either said pivoting, or said rocking of said carrier, causes said pawl to engage said locking member to arrest its movement.

6. Safety apparatus according to claim 5 wherein said means for operative connection to said footbrake system comprises a solenoid and a switch, said switch being provided for actuation by said footbrake system to energise said solenoid; an armature of said solenoid being coupled to said carrier whereby said locking pawl is caused to engage said locking member when said switch is actuated.

7. Safety apparatus according to claim 6 wherein said locking member and said lever are provided with co-operating teeth which engage to arrest movement of said locking member; said lever having a longitudinal axis substantially parallel with the longitudinal axis of said locking member and having one end pivotally mounted in a recess in said housing whereby said housing acts to withstand axial forces applied to said lever when said teeth are engaged and said arm is pivotally moved.

8. Safety apparatus according to claim 7 wherein said carrier is of open box construction and is arranged to support said mass on one side of said locking member and to be coupled to said locking pawl on the other side of said locking member whereby the transverse dimension of said housing is minimized.

9. Safety apparatus according to claim 1 including a solenoid operated latch for securing said arm in an inoperative position wherein said pad is spaced from said occupant's chest, a pressure switch for location beneath the occupant's seat in said vehicle, a limit switch responsive to disengagement of said latch and means responsive to energization of the ignition circuit of said vehicle; said solenoid operated latch being energized to disengage said latch when said pressure switch is actuated by said occupant and said ignition circuit is energized, said limit switch being actuated after said disengagement to de-energise said solenoid operated latch.

10. Safety apparatus according to claim 9 including damping means for damping means for damping the movement of said arm when released from said solenoid operated latch.

11. Safety apparatus according to claim 10 wherein said damping means is coupled with lost motion to said biasing means whereby said damping means is initially inoperative against said light bias but subsequently damps the motion of said arm to cushion abutment between said pad and said occupant's chest.

12. In an automobile, safety apparatus for restraining the movement of an occupant, the safety apparatus comprising a housing; a rigid arm having one end portion rotatably mounted on said shaft; a pad mounted at the other end of said arm for acting against the chest of said occupant; a recoiless energy absorption member coupled to said one end portion of said arm; a locking member coupled to said recoiless energy absorption member and slidably supported in said housing; a locking pawl mounted for movement in said housing to arrest movement of said locking member; means responsive to acceleration or deceleration of said vehicle for moving said pawl to lock said locking member; biasing means coupled between said housing and said arm for lightly biasing said arm towards said occupant's chest except when said locking member is locked; means operatively connected to the footbrake system of said automobile to move said pawl to lock said locking member when said footbrake system is operated; latching means for securing said arm in an inoperative position spaced from said occupants chest and damping means for damping movement of said arm when said latching means is disengaged from said arm.

13. The invention according to claim 12 wherein said recoiless energy absorption member and said locking member are substantially colinearly mounted within said housing and said housing is secured to the floor of the automobile to extend longitudinally between the driver and front passenger seats.

14. The invention according to claim 13 wherein a first portion of said arm is inclined to the vertical and a second portion of said arm is cranked to extend across the respective automobile seat, said shaft being mounted substantially at right angles to said first arm portion to avoid twisting moments which may otherwise be exerted on said shaft when said arm is pivoted.

* * * * *